Oct. 8, 1963 E. A. GALLO 3,106,094
DIFFERENTIAL PRESSURE APPARATUS
Filed Jan. 5, 1960 2 Sheets-Sheet 2
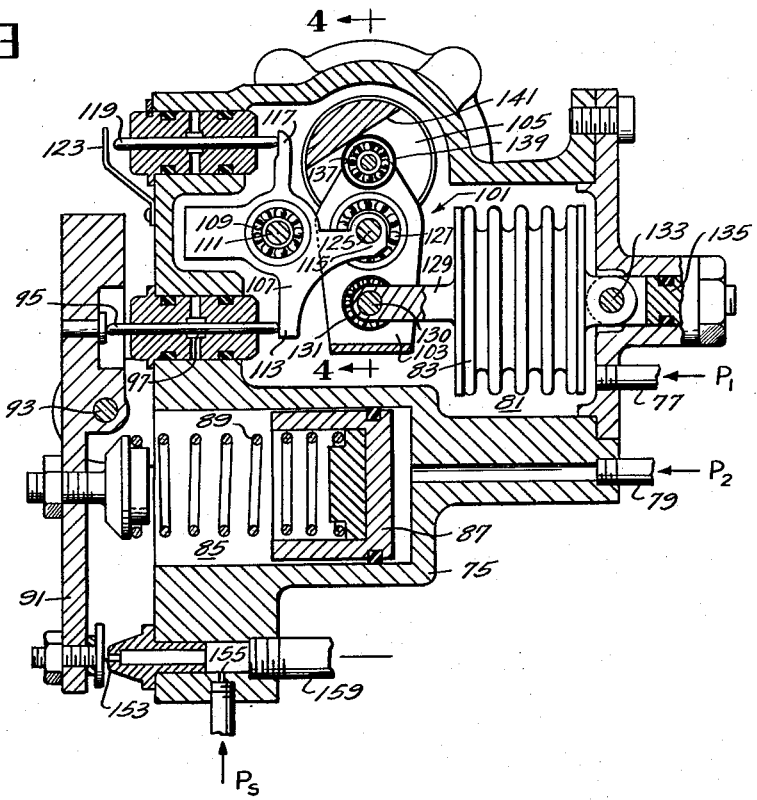
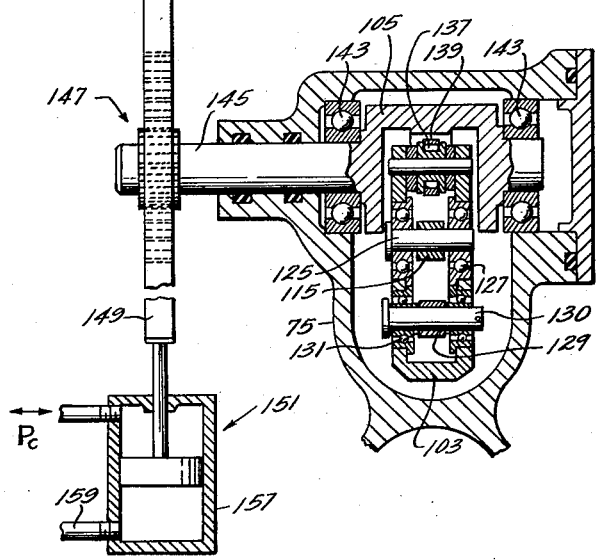
INVENTOR.
ELIA A. GALLO
BY Carl Baker
ATTORNEY

United States Patent Office 3,106,094
Patented Oct. 8, 1963

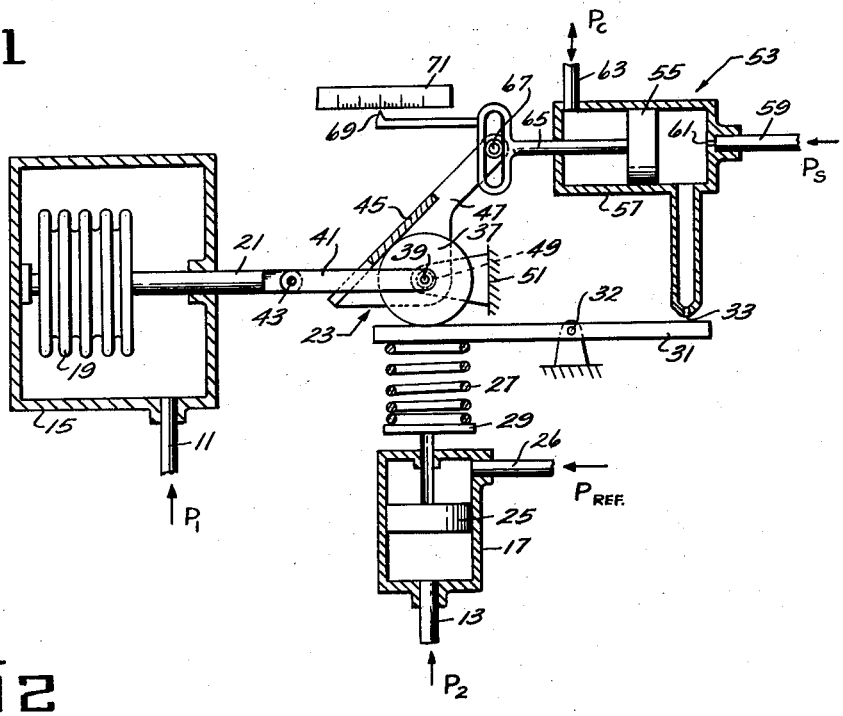
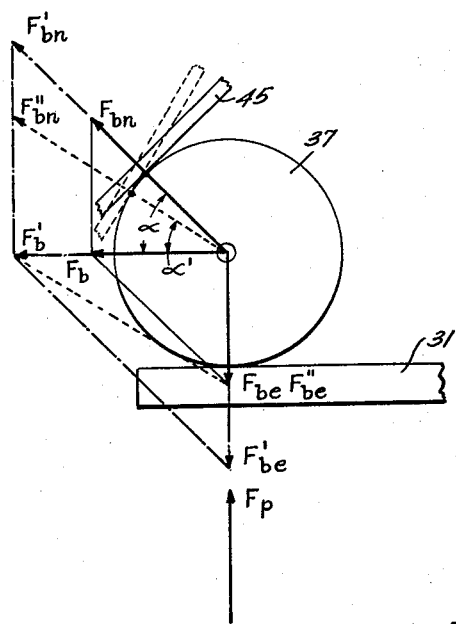

3,106,094
DIFFERENTIAL PRESSURE APPARATUS
Elia A. Gallo, Cincinnati, Ohio, assignor to General Electric Company, a corporation of New York
Filed Jan. 5, 1960, Ser. No. 517
2 Claims. (Cl. 73—407)

This invention relates generally to differential pressure apparatus and more specifically is directed to apparatus of this type responsive to two or more fluid pressures to provide indication or control of ratios between the pressures.

Pressure ratio sensing apparatus has heretofore been proposed comprising a pair of bellows, diaphragms or other pressure responsive elements the force outputs of which are balanced against each other through force linkage mechanism including means for neutralizing a varying portion of the larger pressure derived force so as to achieve balance between the force component not neutralized and the lesser pressure derived force. In this known apparatus means are provided for detecting unbalance between the opposed force components and controlling a servo device for readjusting the force linkage mechanism so as to vary the magnitude of the neutralized force component, thus simultaneously varying the magnitude of the unneutralized component in a manner to restore balance between it and the other pressure derived force.

For many applications pressure ratio devices of this type afford important advantages, principal among which is good accuracy of measurement due to the fact there is little friction except that acting against the servo where it does not detract from accuracy. Also, it is possible to design these devices so as to avoid the need for any net movement of the pressure sensor units, thus minimizing inaccuracies due to hysteresis and nonlinearities in the spring constants of the pressure sensitive elements.

The present invention is directed to pressure ratio devices of this general category and has as its primary object the provision of new and improved apparatus of this type. It is also an object of the invention to provide differential pressure apparatus characterized by good accuracy and reliability of operation and further characterized by simplicity and economy of manufacture.

In carrying out the invention in one preferred embodiment, there is provided a pair of pressure sensitive elements each responsive to applied pressure to produce a pressure derived force. These pressure derived forces are interconnected through force linkage means including a roller or other force movable member having a circular arc surface loaded against a bearing member by the pressure derived forces, with one of these forces being resolved by the force linkage means into a first force component opposing the other pressure derived force and a second force component which is neutralized by the bearing member because directed through the point of tangency between that member and the circular arc surface of the force movable member. The bearing member is mounted for angular movement about an axis nominally coaxial with the center of the circular arc, so that rotation of the bearing member is effective to shift its point of tangency with the circular arc surface, along the arc. Servo means sensitive to unbalance between the opposed force components are provided for rotating the bearing member to shift its point of tangency with the arc surface in a direction and to an extent such that the force component not neutralized at the bearing member is changed in magnitude so as to just balance against the opposed pressure derived force. The position of the bearing member or other part movable with it then provides a measure of the pressure ratio.

The invention will itself be further understood and its various objects, features and advantages more fully appreciated by reference to the appended claims and the following detailed description when read in conjunction with the accompanying drawings, wherein:

FIGURE 1 is a part sectional view of one embodiment of differential pressure apparatus in accordance with the invention;

FIGURE 2 is a schematic illustrating certain principles of operation of the apparatus of FIGURE 1;

FIGURE 3 is a sectional view of an alternative embodiment of the invention; and

FIGURE 4 is a sectional view taken along the line 4—4 in FIGURE 3.

With continued reference to the drawings, wherein like reference numerals have been used throughout to designate like elements, FIGURE 1 illustrates the invention as embodied in apparatus for sensing the ratio of the two pressures $P_1$ and $P_2$. A third pressure, $P_{ref}$, also enters into the operation of the apparatus as hereinafter explained.

Pressures $P_1$ and $P_2$ are communicated to the apparatus through lines 11 and 13, respectively, and sensed by a pair of pressure sensitive elements 15 and 17 each responsive to one of the two applied pressures. The pressure responsive element 15 is of flexible wall type and is shown in the form of a bellows 19 which preferably but not necessarily is evacuated to reduce temperature sensitivity. Bellows 19 has one end fixed to its enclosing housing and its other end free for movement with bellows expansion and contraction due to changes in pressure $P_1$. A push rod 21 fixed to the free end of bellows 19 connects the pressure derived force produced by the bellows to the force linkage mechanism designated generally by reference numeral 23.

The other pressure responsive element 17 is shown in the form of a piston 25 having one side exposed to pressure $P_2$ and the other side exposed to an invariable, relatively low reference pressure $P_{ref}$. The resulting pressure difference across the piston gives rise to an upwardly directed force on piston rod 29, with the magnitude of this force varying directly with $P_2$. This force is transmitted to the force linkage mechanism 23 through a loading spring 27 one end of which bears against the piston rod.

The other end of loading spring 27 bears against a force arm member 31 which is mounted for limited rotation on fixed pivot means 32 disposed intermediate its ends, with the force arm end remote from spring 27 being arranged to control a servo pilot valve 33 as hereinafter described. The upwardly directed force on the left-hand end of force arm 31 acts against a force movable member 37 in the form of a roller mounted for free rotation on a pivot pin 39. Pin 39 is fixed to one end of a link member 41 the other end of which is pivotally connected to the bellows push rod 21 as at 43. The roller 37 is loaded against a bearing member 45 by the combined action of the bellows force and loading spring 27.

Bearing member 45 is provided with a pair of depending ear portions 47, only one of which can be seen in FIGURE 1, with the ear portions being pivotally mounted as at 49 to fixed support members 51. The arrangement preferably is such that the respective axes of the roller pivot 39 and the bearing member pvot 49 are nominally coaxial with each other as shown. This coaxial relationship is "nominal" in the sense that in operation the roller 37 departs slightly from the coaxial position shown, though it does so only momentarily during force balance readjustment as hereinafter described.

Roller 37 and bearing member 45 together constitute force resolution means operative to resolve the leftward-directed force of bellows 19 into two force components. One such force component is downwardly directed and acts in opposition to the upwardly directed force generated by piston 25 and transmitted through its loading spring 27. The second force component is normal to the surface of bearing member 45 at its point of tangency with the circular surface of roller 37. Since the bearing member is fixed by pivot 49 against any movement responsive to this second force component, this force component effectively is neutralized and does not affect the balance or unbalance existing between the other, downwardly directed force component and the upwardly directed force produced by piston 25.

Any unbalance between the upwardly and downwardly directed forces acting on the force arm member 31 will cause that member to rotate about its fixed pivot 32, to vary the size of pilot valve orifice 33 and thus control the rate of pressure fluid bleed from a hydraulic servo-motor indicated generally at 53. This servo comprises a power piston 55 reciprocable within a cylinder 57 the head end of which is supplied with actuating fluid through a conduit 59 connected to a source (not shown) of hydraulic fluid preferably at constant pressure $P_s$. A fixed orifice 61 interposed in supply line 59 coacts with the variable orifice constituted by pilot valve 33, to control pressure level within the head end of the cylinder 57. Pressure fluid at a fixed intermediate pressure $P_c$ is supplied through conduit 63 to the rod end of cylinder 57, to load the power piston against the variable pressure existing in the head end of the cylinder. If preferred, a spring could instead be utilized for loading the piston against the variable pressure, as will be obvious to those skilled in the art.

The servo piston rod 65 has a pin and slot connection as at 67 to the bearing member 45, so as to rotate the bearing member about its fixed pivot 49 on linear movement of the servo piston. As shown, the piston rod also is connected to position a load device. If the system is intended for indicating use only, the load device may comprise any suitable indicating mechanism such as the pointer 69 and scale 71 illustrated; if the system is to be used for control purposes then suitable control mechanism may be substituted for the indicator 69—71. In any case, the load device may be linked either to piston rod 63, bearing member 45 or piston 55, since the position of each of these elements accurately reflects the sensed value of pressure ratio.

When the pressure derived forces produced by bellows 19 and piston 25 are just balanced, the force arm member 31 occupies a null position substantially as illustrated, with the open area of pilot valve 33 being such as to hold the pressure level in the head end of the cylinder at substantially the same value as the fixed pressure $P_c$ supplied to its rod end. Some slight difference in pressures on opposite sides of the piston is necessary for balance, because there is a small differential in piston effective areas due to the piston rod 65 projecting outside the cylinder.

Except for this slight differential, pilot valve 33 at balance holds the cylinder head end pressure at a level just equal to the rod end pressure, and does so by variation of the relationship between its open area and that of fixed orifice 61. For example, if $P_s$ were twice $P_c$ then the pressures across piston 55 could be balanced by positioning the pilot valve to have open area just equal to the open area of orifice 61. The pressure drops across the fixed and variable orifices would then be equal, each equalling one-half $P_s$, and the pressure level in the cylinder head end accordingly would just equal $P_c$.

When the pressure derived forces produced by bellows 19 and piston 25 change in response to a change in the pressure ratio being sensed, a force unbalance will result and will initiate readjustment of the apparatus to again attain balance. For example, as pressure $P_1$ increases, bellows 19 will contract and thus increase the magnitude of the leftwardly directed force which it imposes on roller 37. The downwardly directed component of this force will be of correspondingly greater magnitude and will now exceed the upwardly directed force produced by piston 25.

Roller 37 consequently will roll along the bearing member 45 in a leftwardly direction and also downwardly by reason of the inclination of the bearing member surface. This downward movement of roller 37 will rotate the force arm member 31 in counterclockwise direction, to at least partially close the pilot valve 33 thus increasing the pressure level in the head end of servo cylinder 57.

Power piston 55 responds to this increased pressure by movement to the left, causing the bearing member 45 to rotate about its pivot 49 in counterclockwise direction. When this occurs, the point of tangency between the roller periphery and the bearing member surface moves through an arc, in counterclockwise direction, so that the bearing member now more directly opposes the leftward force of bellows 19 and accordingly neutralizes a larger component of this force. In this manner, the component of the bellows pressure derived force which is neutralized by the bearing member is changed just sufficiently that the other component of this force, i.e., the downwardly acting component, again equals the upwardly acting force generated by piston 25 and the system thus re-attains equilibrium.

The movement of roller 37 necessary to effect this readjustment is very slight and on completion of the adjustment the roller again occupies the same position as before. That this is the case will be apparent from inspection of the force diagram of FIGURE 2, to which reference will now be made.

As there shown, the leftwardly directed force generated by bellows 19 and acting on the roller 37 is represented by the solid line vector $F_b$. This force $F_b$ may be resolved into a first component represented by the solid line vector $F_{bn}$ disposed normal to the bearing member 45 at its point of intersection therewith, and a second component represented by the solid line vector $F_{be}$ which acts downwardly against the force arm 31. This latter force, $F_{be}$, has its line of action in direct alignment with the pressure derived force produced by the piston 25 and represented by the solid line vector $F_p$.

The force component $F_{bn}$ is neutralized by the bearing member 45, since its line of action is parallel to a radius of the roller 37 to its point of tangency with the bearing member surface. As previously noted, the other force component $F_{be}$ has its line of action parallel to that of the force $F_p$. At balance, the force component $F_{be}$ and force $F_p$ are of equal magnitude and accordingly there is no net force on the force arm member 31. The roller and force arm member therefore remain stationary under this condition.

From the force parallelogram of FIGURE 2 it is apparent that $$F_{bn} = \frac{F_b}{\cos \alpha}$$

and $$F_{be} = F_{bn} \sin \alpha = F_b \frac{\sin \alpha}{\cos \alpha} = F_b \tan \alpha$$

where $\alpha$ is the angle between the vector $F_b$ and the vector $F_{bn}$ as shown in FIGURE 2. $F_{be}$ must equal $F_p$ at balance, hence $$F_p = F_b \tan \alpha \text{ or } \frac{F_p}{F_b} = \tan \alpha$$

and since $F_b = (f)P_1$ and $F_p = (f)P_2$, it follows that $$\frac{P_2}{P_1} = (f) \tan \alpha$$

Thus, the pressure ratio $P_2/P_1$ is measurable by the angular position of bearing member 45 or of other parts movable with it.

At equilibrium, then, the force $F_p$ is equal to and balanced against the force component $F_{be}$, and there is no net force on the force arm member 31. Now if the bellows 19 is subjected say to increase in the pressure $P_1$ the bellows force $F_b$ will increase to be as represented by the dot-dash line vector $F_b'$. The force components $F_{bn}$ and $F_{be}$ will also change to become as represented by the dot-dash line vectors $F_n'$ and $F_{be}'$, and as is apparent from FIGURE 2 the downwardly acting force component $F_{be}'$ now is of magnitude exceeding that of the upwardly acting force $F_p$. Roller 37 accordingly moves slightly to the left and down, with consequent downward movement of the force arm member 31. This initiates operation of the servomechanism previously described and, through the action of this servo mechanism, the bearing member 45 is angularly adjusted to assume the position shown in dotted lines.

Movement of bearing member 45 to its dotted line position effects a change in the force parallelogram to become as shown in dotted lines. As indicated by the dotted line representation of the now existing force components, the magnitude of the force component $F_{bn}''$ has increased but its line of action still is parallel to a radius through the bearing member pivot and to the point of roller contact. This force component accordingly is still wholly neutralized by the bearing member.

The downwardly acting force component $F_{be}''$ is now of the same magnitude as the original vector $F_{be}$, and it therefore again equals and balances against the upwardly acting force $F_p$. The system thus has re-attained equilibrium, and the new value of pressure ratio is again measurable by the angular position of the bearing member 45, its position now being a function of $\alpha'$ in FIGURE 2. In event of a pressure ratio change by reason of a decrease in pressure $P_1$, or variation either way in pressure $P_2$, the apparatus will readjust itself automatically to obtain force balance and to indicate the new value of pressure ratio in generally this same manner.

It will be noted that while slight movement of the roller and force arm member is necessary to effect readjustment to null in the manner just explained, the roller and force arm member always occupy precisely the same positions as before when the readjustment has been completed. This feature of the invention is particularly advantageous because it permits pressure ratio measurement with no net movement of the bellows push rod or of the bellows itself. Thus, during steady-state operation the bellows length always is precisely the same and does not vary with changes in the pressure sensed. As a result, the system is unaffected by the bellows spring constant, usually a troublesome factor in pressure ratio apparatus design.

In the particular embodiment illustrated, movement of the pressure sensor piston 25 is required to attain equilibrium at differing pressure ratios, but as previously mentioned the spring constant of the piston loading spring 27 normally has no significant affect on accuracy of measurement. If preferred, a bellows or diaphragm could of course be substituted for the piston type sensor shown and spring 27 omitted entirely, in which case there would be no net movement of either pressure responsive element and each would always occupy the same position at null.

It will be appreciated that the pressure responsive element 17 need not be in direct alignment with the point of contact between roller 37 and force arm 31 as shown. The pressure responsive element 17 could if preferred be disposed to either side of the roller such distance as necessary to provide any desired force multiplication. Various other modified arrangements of the pressure responsive elements and force linkage mechanism are also feasible, as will be apparent to those skilled in the art. One such modified form of the invention is illustrated in FIGURES 3 and 4, to which reference will now be made.

In FIGURE 3 the two pressures $P_1$ and $P_2$ the ratio between which is to be sensed are connected into the sensor housing 75 through fittings 77 and 79 respectively.

Pressure $P_1$ connects into a chamber 81 containing a bellows 83 similar in purpose and operation to the bellows 19 of FIGURE 1. Pressure $P_2$ enters the head end of a cylinder 85 formed within housing 75, and there acts against one face of a pressure sensing piston 87, which again corresponds in purpose and function to the piston 25 of FIGURE 1.

The other face of piston 87 is subjected, through the open end of cylinder 85, to a reference pressure corresponding to $P_{ref}$ in FIGURE 1. In the particular application here illustrated, however, this reference pressure is a fixed ambient pressure maintained in an enclosing housing (not shown) filled with fluid at constant pressure. Such arrangement is not essential to operation of the apparatus, however, and other reference pressures including ambient atmospheric could instead be used.

Piston 87 acts through a load spring 89 to impose, on a force arm member 91, a force derived from and proportional to the pressure $P_1$. Force arm member 91 is rotatably mounted to the housing 75 by pivot means 93, to permit limited angular movement of the force arm member about its pivot axis. A push rod 95 bears against the force arm member in opposition to the force imposed thereon by spring 89. This push rod preferably is provided with fluid seal means 97, which may be of any suitable construction, at the point where it passes through housing 75.

Within the housing, the push rod 95 is subjected to a pressure derived force produced by bellows 83 and imposed on the push rod through variable force linkage mechanism designated generally at 101 and including a yoke 103, bearing member 105 and bellcrank 107. These elements coact, in the manner hereinafter described in detail, to resolve the bellows pressure derived force into two force components one of which is neutralized because directed against bearing member 105 and the other of which acts through the bellcrank 107 to load the push rod 95.

As shown, bellcrank 107 is rotatably mounted by bearing means 109 to a pivot pin 111 fixed in housing 75. The bellcrank includes two crank arms 113 and 115, and preferably but not necessarily includes a third crank arm 117 against which bears a dummy push rod 119 slidable within a seal 121 in the wall of housing 75. A stop device 123 limits outward movement of this dummy push rod to prevent its dropping out of the housing either during handling or by reason of pressure differences between the housing interior and ambient.

The purpose of this dummy push rod is to compensate for the affects of any pressure difference between the housing interior and ambient, which pressure difference would act on the working push rod 95. Normally in the particular application being described the ambient pressure differs substantially from the $P_2$ pressure which exists within housing 75 and, while the cross-sectional area of push rod 85 is small, the effect of this pressure difference on the push rod still could detract slightly from accuracy of measurement unless compensated for as by the dummy push rod.

The arm 115 of bellcrank 107 carries a pivot pin 125 the opposite ends of which rotate within antifriction bearing means 127 mounted on opposite walls of yoke member 103, intermediate the ends thereof. Adjacent the lower end of yoke member 103, the bellows push rod 129 carries a pivot pin 130 journaled in antifriction bearing means 131 in opposite walls of the yoke. Preferably, bellows 83 is pivotally connected as at 133 to a mounting element fixed in the housing 75. This pivotal connection gives good freedom of action but is not essential since, as previously explained in connection with FIGURE 1, there are only temporary slight changes in bellows position during normal operation and these can be accommodated by the inherent flexibility of the bellows unit.

Adjacent its upper end the yoke 103 carries force movable means in the form of an antifriction bearing 137 the outer race 139 of which constitutes a roller element loaded against the bearing surface 141 of bearing member 105 by the combined action of loading spring 89 and bellows 83. The bearing member 105 is journaled for rotation within housing 75 on antifriction bearing means 143 (FIGURE 4), and includes a shaft 145 projecting to the exterior of the housing.

Shaft 145 has a rack and pinion connection as at 147 to the actuating rod 149 servo-motor means indicated generally at 151. Servo 151 corresponds in structure and function to the servo 53 of FIGURE 1 and, as in FIGURE 1, is under control of a pilot valve 153 the open area of which is controlled by the lower end of force arm member 91. Variation of the open area of this variable orifice, as compared to the open area of a fixed orifice 155, modulates the pressure level existing in the head end of the servo cylinder 157, the rod end being held at constant pressure $P_c$ as previously described in connection with FIGURE 1. The pilot valve controlled servo pressure is supplied to cylinder 157 through a line 159, FIGURES 3 and 4.

In operation of the apparatus of FIGURES 3 and 4, the pressure derived force produced by bellows 83 is resolved by the force linkage mechanism 101 into two force components. One such component is neutralized at the bearing surface 141 of bearing member 103, the force component thus neutralized being of magnitude such that the other, downwardly directed force component balances against the upwardly directed force on bellcrank arm 115 produced by piston 87, and remains so balanced until change occurs in one of the sensed pressures.

For example, assuming constant $P_1$ and an incerase of $P_2$, piston 87 will move to the left to increase the compression of spring 89 and thus increase the spring force on force arm member 91. The force arm member, acting through push rod 95, will tend to rotate the bellcrank 107 in counterclockwise direction. This rotation is possible only on upward movement of yoke member 103 with consequent rotation of the yoke member about the axis of the bellcrank pin 125, and such movement is resisted by the effective or unneutralized component of the pressure derived force produced by bellows 83. Since this force component now is of lesser magnitude than the opposing force produced by piston 87, however, a force unbalance will exist permitting rotation of yoke 103.

This rotation, and the resulting upward movement of yoke member 103, permits rotation of the bellcrank 107 and of the force arm member 91, with consequent opening movement of the pilot valve 153. There results a drop in pressure level in the head end of servo cylinder 157, and the servo piston moves to adjust the associated control or indicating mechanism to provide a measure of the new pressure ratio value. Movement of the servo power piston to indicate this pressure ratio value simultaneously readjusts the bearing member 105, through rack and pinion 147, to again attain balance between the pressure derived forces by shifting the point of tangency between the bearing member surface 141 and roller 137.

The resolution of forces in and force diagram for the embodiment of FIGURE 3 is substantially the same as in the case of FIGURE 1 and explained by reference to FIGURE 2. It will be appreciated that in both of the illustrated embodiments of the invention the selection of the bellows pressure derived force as being the force resolved by the force linkage means is an arbitrary one; it is equally valid to consider the piston pressure derived force as being the force which is resolved into effective and neutralized components. The results are, of course, precisely the same regardless of which of these approaches is taken in analyzing the forces involved.

It will also be appreciated that the bearing member surface need not be planar as illustrated in FIGURES 1 and 3, but may if preferred be given either positive or negative curvature with resulting change in sensitivity of the apparatus. Also, by adjustment of the linkage between the servo and the bearing member, it is possible to correct any unwanted nonlinearity in the system or to introduce nonlinearity if desired in the measurement.

Certain preferred embodiments of the invention have been described and illustrated by way of example in the foregoing, but many modifications will occur to those skilled in the art and it therefore should be understood that the appended claims are intended to cover all such modifications as fall within the true spirit and scope of the invention.

What is claimed as new and desire to be secured by Letters Patent of the United States is:

1. A pressure ratio sensor comprising a pair of pressure sensitive elements each responsive to applied pressure to produce a pressure derived force, force linkage means including a force movable member having a circular arc surface and a bearing member mounted for rotation about a fixed axis nominally coaxial with said circular arc surface and having a bearing surface contacting said circular arc surface at a point of tangency which shifts along the arc on rotation of said bearing member, means connecting said force movable member at the axis of its circular surface to said pressure sensitive elements with the pressure derived forces acting upon said force movable member and angularly disposed with respect to each other and with respect to the arc radius to said point of tangency whereby the pressure derived forces are resolved into force components two of which are in opposed relation and one of which has its line of action substantially parallel to said arc radius so as to be neutralized at said bearing member surface, means for sensing movement of said force movable member responsive to unbalance between said opposed force components, and means operative under control of said last-named means for rotating said bearing member to shift its point of tangency with said force movable member in a direction to restore force balance.

2. A pressure ratio sensor comprising a pair of pressure sensitive elements each responsive to applied pressure to produce a pressure derived force, force linkage means including a roller rotatable about an axis and having a circular peripheral surface, a bearing member mounted for rotation about a fixed axis nominally coaxial with said roller axis and having a bearing surface contacting said roller surface at a point of tangency which shifts along the roller periphery on rotation of said bearing member, means connecting said roller to said pressure responsive elements with their pressure derived force vectors angularly disposed with respect to each other and with respect to a radius of said roller to its point of tangency with said bearing member surface whereby the pressure derived forces are resolved into force components two of which are in opposed relation and one of which has its line of action parallel to said roller radius so as to be neutralized at said bearing member surface, means for sensing movement of said roller responsive to unbalance between said opposed force components, and means operative under control of said last-named means for rotating said bearing member to shift its point of tangency with said roller in a direction to restore force balance.

References Cited in the file of this patent

UNITED STATES PATENTS

| | | |
|---|---|---|
| 2,538,824 | Andressen | Jan. 23, 1951 |
| 2,736,199 | Ibbott | Feb. 28, 1956 |
| 2,826,913 | Rosenberger | Mar. 18, 1958 |
| 2,991,006 | Clarke | July 4, 1961 |